United States Patent
Yamamoto et al.

(10) Patent No.: US 6,506,446 B2
(45) Date of Patent: Jan. 14, 2003

(54) ANTI-FOG COATING MATERIAL AND METHOD OF PREPARING AN ANTI-FOG ARTICLE

(75) Inventors: Tohru Yamamoto, Shiga-ken (JP); Shigeo Yoshida, Shiga-ken (JP); Hatsumi Ikari, Shiga-ken (JP); Keiji Ikemori, Yokohama (JP); Keiji Ohtaka, Yokohama (JP); Hideo Ukuda, Yokohama (JP)

(73) Assignees: Canon Kabushiki Kaisha, Tokyo (JP); Nakato Laboratory, Inc., Shiga (JP)

( * ) Notice: Subject to any disclaimer, the term of this patent is extended or adjusted under 35 U.S.C. 154(b) by 0 days.

(21) Appl. No.: 10/006,656

(22) Filed: Dec. 10, 2001

(65) Prior Publication Data

US 2002/0061950 A1 May 23, 2002

Related U.S. Application Data

(62) Division of application No. 09/169,975, filed on Oct. 13, 1998, now abandoned.

(30) Foreign Application Priority Data

Oct. 13, 1997 (JP) .............................. 9-279012

(51) Int. Cl.[7] .............................. B05D 5/06; C09K 3/18
(52) U.S. Cl. .................... 427/165; 427/162; 427/163.1; 427/164; 427/384; 427/389.7; 106/13
(58) Field of Search .............................. 427/162, 163.1, 427/163.2, 164, 165, 168, 372.2, 384, 389.7 393.4; 106/13

(56) References Cited

U.S. PATENT DOCUMENTS

| | | | | |
|---|---|---|---|---|
| 3,222,210 A | * | 12/1965 | Hammond | .................. 426/129 |
| 3,895,155 A | * | 7/1975 | Shukuri et al. | .............. 351/166 |
| 4,212,920 A | | 7/1980 | Seamans | ...................... 428/413 |
| 4,478,909 A | * | 10/1984 | Taniguchi et al. | ........... 428/331 |
| 5,494,705 A | * | 2/1996 | Yamasoe et al. | ............. 427/327 |
| 5,759,347 A | * | 6/1998 | Leube et al. | ................ 101/492 |
| 5,897,960 A | * | 4/1999 | Oba et al. | ................. 427/372.2 |
| 5,932,137 A | * | 8/1999 | Baba et al. | ............ 252/299.64 |
| 6,287,683 B1 | | 9/2001 | Itoh et al. | .................... 428/336 |

FOREIGN PATENT DOCUMENTS

JP         50-098509 A   *   8/1975

OTHER PUBLICATIONS

Patent Abstract of Japan, vol. 018, No. 485 (C–1248) Sep. 1994 for JP 06–158031.

Patent Abstract of Japan, No. 011, No. 335 (P–632) Nov. 1987 for JP 62–118301.

Patent Abstract of Japan, No. 004, No. 155 (C–029) Oct. 1980 for JP 55–099987.

Database WPI, Section Ch, Week 8142, Derwent Publ. AN 81–768530 (1981).

* cited by examiner

*Primary Examiner*—Shrive P. Beck
*Assistant Examiner*—Wesley Markham
(74) *Attorney, Agent, or Firm*—Fitzpatrick, Cella, Harper & Scinto

(57) ABSTRACT

An anti-fog article is obtained by coating a substrate with an anti-fog coating material to form thereon an anti-fog coating film that is hydrophillic, moisture-absorptive, insoluble and excellent in surface hardness. The anti-fog coating material contains a polyacrylic acid compound, polyvinyl alcohol and acetylacetone, and optionally sodium silicate.

10 Claims, No Drawings

ANTI-FOG COATING MATERIAL AND METHOD OF PREPARING AN ANTI-FOG ARTICLE

This is a division of application Ser. No. 09/169,975, filed Oct. 13, 1998, now abandoned.

FIELD OF THE INVENTION AND RELATED ART

The present invention relates to an anti-fog coating material capable of forming an insoluble coating film having a high surface hardness and a hydrophilicity and moisture absorptivity-imparting function onto substrates, such as optical lenses, spectacles and window panels for vehicles expected to show anti-fog property and anti-(moisture) condensation property, and ink jet printer recording films, and also to an anti-fog article provide with an anti-fog coating film formed by using such an anti-fog coating material.

A substrate, such as that of glass or a plastic, may become foggy when the surface temperature thereof is cooled to below a dew point of atmospheric air, and atmospheric moisture is attached to the surface in the form of fine droplets to cause random reflection of light incident to the substrate surface. Accordingly, it may be possible to prevent the fog on the substrate by preventing such moisture droplet formation on the substrate surface. In such a fog-preventing method, for example, four measures of (A) adjustment of wettability, (B) provision of moisture absorptivity, (C) provision of water repellency and (D) moisture adjustment by heating, have been considered.

The measure (A) as by use of a surface active agent cannot provide a long lasting effect.

The effect given by the measure (B) lasts for a longer period than that given by (A), but fog is liable to occur and the surface is liable to be dissolved when the moisture exceeds the moisture-absorptive capacity.

The measure (C) provides the anti-fog property by causing water droplets to fall off the surface due to the water repellency of the surface, but cannot cope with fine water droplets.

The measure (D) provides the anti-fog effect owing to moisture adjustment by heating, but the scope of application thereof is restricted by the necessity of an electric power supply.

SUMMARY OF THE INVENTION

In view of the above-mentioned problems, an object of the present invention is to provide a coating material for providing an anti-fog coating film that is hydrophillic, moisture-absorptive and insoluble and also has an excellent surface hardness.

Another object of the present invention is to provide an anti-fog article provided with an anti-fog coating film formed by using such an anti-fog coating material.

According to the present invention, there is provided an anti-fog coating material or composition, comprising: a polyacrylic acid compound, polyvinyl alcohol and acetylacetone. The coating material may further contain sodium silicate.

According to another aspect of the present invention, there is provided an anti-fog article, comprising: a substrate and a coating film formed on the substrate by application of a solution containing a polyacrylic acid compound, polyvinyl alcohol and acetylacetone.

An anti-fog coating film formed of the anti-fog coating material of the present invention is water-insoluble, and has a high surface hardness and excellent durability. Such properties may be attributable to an improved mutual solubility between the polyacrylic acid compound and the polyvinyl alcohol accomplished by the presence of acetylacetone therebetween. More specifically, a polyacrylic acid compound and polyvinyl alcohol have poor mutual solubility therebetween but are both well dissolved together with acetylacetone to form a uniform coating film. The coating film is hard, excellent in durability and water-insoluble. This is presumably because the improved mutual solubility between the polyacrylic acid compound and polyvinyl alcohol promotes mutual interaction of polymer chains of these compounds to provide an insoluble coating film, wherein the acetylacetone is retained presumably in a chemically bonded state with the polyacrylic acid compound and the polyvinyl alcohol.

DETAILED DESCRIPTION OF THE INVENTION

Preferred examples of the polyacrylic acid compound may include: polyacrylic acid, polymethacrylic acid, and lower alkyl (C1–C4) esters, particularly methyl and ethyl esters, respectively, of acrylic acid and methacrylic acid. It is preferred that the alkyl esters of polyacrylic acid and polymethacrylic acid respectively have a saponification degree (i.e., mols of hydrolyzed ester groups×100/(mols of hydrolyzed ester groups+mols of non-hydrolyzed ester groups) of 10–30 mol. %. The polyacrylic acid compound may preferably have a weight-average molecular weight (Mw) of 50,000–350,000 in terms of polystyrene-equivalent molecular weight according to gel permeation chromatography (GPC).

The polyvinyl alcohol used in the present invention may preferably be in the form of a partially or incompletely saponified product of polyvinyl acetate that has a polymerization degree (Dp) of at least 1,000, is soluble in an organic solvent and has a saponification degree (i.e., mols of hydroxyl group×100/(mols of acetyl group+mols of hydroxyl group) of 65–85 mol. %, more preferably 75–82 mol. %. The polyvinyl alcohol may preferably be used in an amount of 100–1000 wt. parts (as solid) per 100 wt. parts (as solid) of the polyacrylic acid compound.

Acetylacetone may be used in the coating material of the present invention before the application thereof in an amount of 3–50 wt. parts per 100 wt. parts (as solid) of the total of the polyacrylic acid compound and the polyvinyl alcohol.

The anti-fog coating material according to the present invention before the application thereof may preferably be in the form of a solution in an organic solvent, which may preferably be a water-miscible organic solvent, such as methyl alcohol, ethyl alcohol or isopropyl alcohol. The organic solvent may further preferably be used in combination with water. The preferred ratio of the organic solvent to water may be different depending on the particular solvent used, e.g., 80–120 wt. parts of methyl alcohol or ethyl alcohol, or 40–80 wt. parts of isopropyl alcohol, respectively, per 100 wt. parts of water.

The anti-fog coating material according to the present invention may further preferably contain sodium silicate, which may preferably have an $SiO_2/Na_2O$ mol ratio of 2.1–3.1 The sodium silicate may preferably be used in 0.5–10 wt. parts (as solid) per 100 wt. parts (as solid) of the total of the polyacrylic acid compound and the polyvinyl alcohol.

The anti-fog coating material according to the present invention may be used to coat a substrate, examples of which may include: glass articles and plastic articles, such as, lenses, optical parallel plates, and mirrors, prisms.

The anti-fog article according to the present invention may for example be prepared in the following manner. The above-mentioned respective components of the anti-fog coating material are blended to form a clear coating liquid. Then, the coating liquid is applied onto at least one surface of a substrate as described above and dried under heating at a temperature of at least 80° C., preferably 120–200° C., to provide an anti-fog article of the present invention. The above coating liquid application may be repeated several times, as desired, to provide an increased thickness of the coating film, with or without heating after each application. The heating may also be performed after several times of application.

The coating film may preferably have a thickness of 0.01 $\mu$m–1.0 $\mu$m, e.g., for optical lenses, and 1.0 $\mu$m–10.0 $\mu$m, e.g., for window panels. The coating film thickness may be adjusted appropriately by applying a thick layer of the coating liquid or by repeatedly applying the coating liquid in superposition.

The thus-prepared anti-static article may have a surface provided with anti-fog property and anti-condensation property. The resultant anti-fog coating film is insoluble in water and organic solvent and exhibits a high surface hardness.

In a preferred embodiment of preparation of the anti-fog coating material according to the present invention, the polyacrylic acid compound and polyvinyl alcohol are dissolved in a solvent mixture of a lower alcohol, as an organic solvent, and water, and acetylacetone is added to form a uniform coating mixture liquid, which may be dried to provide a uniform film layer through uniform drying without exceeding mutual solubility-separation limit during the film formation step owing to the function of the acetylacetone.

In another preferred embodiment of preparation of the anti-fog coating material according to the present invention, the polyacrylic acid compound, polyvinyl alcohol and sodium silicate are blended and dissolved in a solvent mixture of a lower alcohol and water, followed by addition of acetylacetone to form a uniform coating mixture liquid, which may be dried while precipitating $SiO_2$ due to hydrolysis of the sodium silicate to provide a uniform film layer through uniform drying without exceeding mutual solubility-separation limit during the film formation step owing to the function of the acetylacetone. The sodium silicate may be contained in the resultant coating film in its hydrolyzed form.

EXAMPLES

Hereinbelow, the present invention will be described more specifically based on Examples.

Example 1

TABLE 1

| | |
|---|---|
| Polymethylmethacrylate 20 mol. %-saponified product (Mw = 15 × 10⁴) (2.3 wt. % solution in water/methanol (=100/100 by weight) | 52.0 wt. parts |
| Polyvinyl alcohol 10 wt. %-aqueous solution (Dp = 2000, ca. 82 mol. %-saponified product) | 47.1 wt. parts |
| Acetylacetone | 0.9 wt. part |
| Total | 100.0 wt. parts |

A coating liquid was prepared according to the prescription shown in Table 1 above (with the respective components indicated in weight parts). More specifically, into 52.0 wt. parts of 2.3 wt. %-solution in methanol/water of 20 mol. %-saponified polymethyl methacrylate (prepared by dissolving the polymethyl methacrylate in methyl alcohol, followed by addition of sodium hydroxide aqueous solution in an amount sufficient for 20 mol. %-saponification and stirring for 30 min.), 10%-aqueous solution of polyvinyl alcohol (Dp (average polymerization degree)=2000, Dssp. (saponification degree)=ca. 82 mol. %) was added, and the resultant mixture was further stirred for 10 min. at room temperature (25° C.), followed by addition of acetylacetone and 15 min. of stirring at room temperature, to prepare a coating liquid.

The thus-prepared coating liquid was colorless and clear and applied onto a glass sheet of 40 mm×70 mm×1 mm(t) at a pulling-up speed of 30 mm/min. by using a dip coater, followed by 10 min. of drying under heating at 100° C., to provide a uniform, colorless and clear coating film having a thickness of 3.0 $\mu$m.

The coated glass sheet was then stored for 5 min. in a refrigerator (at ca. 0° C.) and then left standing in an environment of 25° C. and 81% relative humidity, whereby no fog occurred at all on the coated surfaces of the glass sheet. Further, one surface of the coated glass sheet was wiped 20 times with a lens-cleaning paper ("Dasper" (trade name), OZU Co., Ltd., Tokyo) soaked with water under a load of 200 g, whereby the coating film was not peeled off at all or damaged at all.

Comparative Example 1

A coating liquid was prepared and applied onto a glass sheet in the same manner as in Example 1 except for omitting the addition of the acetylacetone. After the drying and heating, a somewhat turbid coating film was formed in a thickness of 2.8 $\mu$m. As a result of the same tests as in Example 1, no fog occurred on the coating film, but the coating film caused peeling-off after ca. 5 times of the wiping.

Example 2

TABLE 2

| | |
|---|---|
| Methyl acrylate/ethyl acrylate/methacrylic acid (40/40/2 by weight) copolymer ammonium salt (Mw = 12 × 10⁴) (2.5 wt. % solution in water/methanol) | 50.0 wt. parts |
| Polyvinyl alcohol (Dp = 2000, Dsap = ca. 82 mol. %) (10 wt. % aqueous solution) | 49.0 wt. parts |
| Acetylacetone | 1.0 wt. part |
| Total | 100.0 wt. parts |

A coating liquid was prepared according to the prescription shown in Table 2 above and applied onto a glass sheet, followed by drying under heating, in the same manner as in Example 1, whereby a uniform, colorless and clear coating film was formed in a thickness of 3.3 μm. As a result of the tests in the same manner as in Example 1, the coating film caused no fog at all on the surface and caused no peeling or damage after the wiping.

Example 3

| | |
|---|---|
| Polymethyl acrylate 20 mol. %-saponified product (Mw = 15 × 10$^4$) (2.5 wt. %-solution in water/methanol) | 50.3 wt. parts |
| Polyvinyl alcohol (Dp = 2000, Dsap = ca. 82 mol. %) (10 wt. %-aqueous solution) | 45.7 wt. parts |
| Sodium silicate (SiO$_2$/Na$_2$O = 3.1 (by mol)-aqueous solution | 3.1 wt. parts |
| Acetylacetone | 0.9 wt. part |
| Total | 100.0 wt. parts |

A coating liquid was prepared according to the prescription shown in Table 3 above and applied onto a glass sheet, followed by 10 min. of drying under heating at 130° C., otherwise in the same manner as in Example 1, whereby a uniform, colorless and clear coating film was formed in a thickness of 3.0 μm. As a result of the tests in the same manner as in Example 1, the coating film caused no fog at all on the surface and caused no peeling or damage after 20 times of wiping with water-soaked lens-cleaning paper.

What is claimed is:

1. A method of preparing an anti-fog article comprising:
   a) dissolving a polyacrylic acid compound and polyvinyl alcohol together with acetylacetone to form a solution;
   b) coating a substrate with the solution; and
   c) drying the coating solution to leave a non-turbid coating film that is resistant to peeling off.

2. The method according to claim 1 wherein the solution further contains sodium silicate.

3. The method according to claim 2 wherein the solution contains 0.5–10 wt. parts as a solid of the sodium silicate per 100 wt. parts as a solid of the total of the polyacrylic acid compound and the polyvinyl alcohol.

4. The method according to claim 1 wherein the solution contains 100–1000 wt. parts as a solid of the polyvinyl alcohol per 100 wt. parts as a solid of the polyacrylic acid compound, and 3–50 wt. parts of the acetylacetone per 100 wt. parts as a solid of the total of the polyacrylic acid and the polyvinyl alcohol.

5. The method according to claim 1 wherein the polyacrylic acid compound has a weight-average molecular weight (Mw) of 50,000–350,000 in terms of polystyrene-equivalent molecular weight according to gel permeation chromatography.

6. The method according to claim 1 wherein the polyvinyl alcohol is in the form of a partially saponified product of polyvinyl acetate that has a polymerization degree (Dp) of at least 1,000, and has a saponification degree of 65–85 mol. %.

7. The method according to claim 6 wherein the polyvinyl alcohol has a saponification degree of 75–82 mol. %.

8. The method according to any one of claims 1–7, wherein the coating film has a thickness of 0.01 μm–1.0 μm, and the substrate is a lens.

9. The method according to any one of claims 1–7, wherein the coating film has a thickness of 1.0 μm–10.0 μm, and the substrate is a window panel.

10. The method according to any one of claims 1–7, wherein the substrate is a member selected from the group consisting of lenses, optical parallel plates, mirrors, prisms, glass articles and plastic articles.

* * * * *

UNITED STATES PATENT AND TRADEMARK OFFICE
CERTIFICATE OF CORRECTION

PATENT NO.    : 6,506,446 B2
DATED         : January 14, 2003
INVENTOR(S)   : Tohru Yamamoto et al.

It is certified that error appears in the above-identified patent and that said Letters Patent is hereby corrected as shown below:

<u>Title page</u>,
Item [57], ABSTRACT,
Line 3, "hydrophillic," should read -- hydrophilic, --.

<u>Column 1</u>,
Line 14, "onto" should read -- on --; and
Line 18, "also" should read -- also relates --; and "provide" should read -- provided --.

<u>Column 4</u>,
Line 19, "Dssp." should read -- Dsap. --.

Signed and Sealed this

Ninth Day of September, 2003

JAMES E. ROGAN
*Director of the United States Patent and Trademark Office*